(12) United States Patent
Im et al.

(10) Patent No.: US 8,654,219 B2
(45) Date of Patent: Feb. 18, 2014

(54) METHOD AND APPARATUS FOR RESTORING DEAD PIXEL USING LIGHT INTENSITY MAP IN A TIME-OF-FLIGHT CAMERA

(75) Inventors: Soungmin Im, Seoul (KR); Soungsoo Park, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 197 days.

(21) Appl. No.: 13/094,290

(22) Filed: Apr. 26, 2011

(65) Prior Publication Data

US 2012/0274792 A1    Nov. 1, 2012

(51) Int. Cl.
  *H04N 9/64* (2006.01)
  *H04N 5/228* (2006.01)
  *G06F 3/033* (2013.01)
  *H04N 7/16* (2011.01)

(52) U.S. Cl.
  USPC ........... 348/246; 348/222.1; 715/863; 725/10

(58) Field of Classification Search
  USPC ......................... 348/246; 715/863; 725/10, 12
  See application file for complete search history.

(56) References Cited

U.S. PATENT DOCUMENTS

| | | | |
|---|---|---|---|
| 2009/0077504 A1* | 3/2009 | Bell et al. ........................ | 715/863 |
| 2009/0228841 A1* | 9/2009 | Hildreth ......................... | 715/863 |
| 2011/0187819 A1* | 8/2011 | Katz et al. ......................... | 348/43 |
| 2011/0296353 A1* | 12/2011 | Ahmed et al. ................. | 715/848 |
| 2012/0262574 A1* | 10/2012 | Park et al. ...................... | 348/143 |

OTHER PUBLICATIONS

IEEE publication titled, "Data-Fusion of PMD-Based Distance-Information and High-Resolution RGB-Images"; Published 2007.*

* cited by examiner

*Primary Examiner* — Tuan Ho
*Assistant Examiner* — Shahbaz Nazrul
(74) *Attorney, Agent, or Firm* — Birch, Stewart, Kolasch & Birch, LLP

(57) ABSTRACT

Disclosed herein is an image display apparatus including a display unit; a camera unit configured to capture a subject, and to acquire a depth image from the captured subject; and a controller operatively connected to the display unit and the camera unit, the controller configured to control the camera unit to restore an interest region based on depth information and light intensity information when the interest region exists in the acquired depth image.

19 Claims, 13 Drawing Sheets

FIG. 6A

|   | 0 | 1 | 2 | 3 | 4 |
|---|---|---|---|---|---|
| 0 | 1011 | 1004 | 1001 | 1002 | 1002 |
| 1 | 1005 | 1010 | 547 | 543 | 542 |
| 2 | 1001 | 541 | 542 | 547 | 4000 |
| 3 | 1002 | 547 | 0 | 547 | 540 |
| 4 | 1002 | 547 | 547 | 541 | 548 |

|   | 0 | 1 | 2 | 3 | 4 |
|---|---|---|---|---|---|
| 0 | 227 | 226 | 229 | 221 | 229 |
| 1 | 221 | 228 | 49 | 40 | 41 |
| 2 | 226 | 41 | 41 | 41 | 44 |
| 3 | 221 | 47 | 47 | 49 | 45 |
| 4 | 229 | 43 | 49 | 43 | 48 |

|   | 0 | 1 | 2 | 3 | 4 |
|---|---|---|---|---|---|
| 0 | 1011 | 1004 | 1001 | 1002 | 1002 |
| 1 | 1005 | 1010 | 547 | 543 | 542 |
| 2 | 1001 | 541 | 542 | 547 | 543 |
| 3 | 1002 | 547 | 544 | 547 | 540 |
| 4 | 1002 | 547 | 547 | 541 | 548 |

— 640

METHOD AND APPARATUS FOR RESTORING DEAD PIXEL USING LIGHT INTENSITY MAP IN A TIME-OF-FLIGHT CAMERA

BACKGROUND OF THE INVENTION

1. Field of the Invention

The present disclosure relates to a method and apparatus for restoring a dead pixel in a camera using a time-of-flight (TOF) technique, and more particularly, to a method and apparatus for restoring a dead pixel of a depth map by using a light intensity map.

2. Description of the Related Art

In the existing TOF-type camera, a depth image has been generated only by using a depth map for the image. In this case, when a boundary portion of the depth image generated from a subject is affected by lighting, a shadow or the like, the reliability may be reduced for a particular portion of the depth image generated from the subject, thereby not allowing a depth value of the relevant portion to be used.

SUMMARY OF THE INVENTION

An aspect of the present disclosure is to provide a method and apparatus for restoring a dead pixel generated in a depth map using the depth map and intensity map that have been acquired through a TOF-type camera, particularly, an image sensor.

According to the present disclosure, there is provided an image display apparatus including a display unit; a camera unit configured to capture a subject, and to acquire a depth image from the captured subject; and a controller operatively connected to the display unit and the camera unit, the controller configured to control the camera unit to restore an interest region based on depth information and light intensity information when the interest region exists in the acquired depth image.

Furthermore, it is characterized in that the controller controls the display unit to display the restored depth image when the interest region is restored.

Furthermore, it is characterized in that the interest region is a dead pixel.

Furthermore, it is characterized in that the controller controls the display unit to display an indicator when the interest region is restored.

Furthermore, it is characterized in that the indicator is a shape of the restored depth image.

Furthermore, it is characterized in that the controller controls the displayed indicator to be moved or controls a predetermined function to be carried out according to the movement of the subject.

Furthermore, it is characterized in that the movement of the subject is any one direction of left, right, top or down, or a gesture.

Furthermore, it is characterized in that the controller controls an application at a position located with the indicator or adjacent to the position to be activated when detecting a movement of distance between the subject and the image display apparatus drawing closer.

Furthermore, it is characterized in that the predetermined function is a function for displaying the previous or next screen, and the controller controls the predetermined function to be carried out when detecting a rotational movement in a clockwise or counter clockwise direction of the subject.

Furthermore, it is characterized in that the predetermined function is a function for displaying one or more screens, and the controller controls the predetermined function to be carried out when detecting continuous movements of the subject between left and right.

Furthermore, it is characterized in that the camera unit includes a memory; an emitter for illuminating a light source; an image sensor for acquiring depth information and light intensity information from a subject; and a camera controller for controlling an interest region corresponding to part of the acquired depth information to be extracted, and the extracted interest region to be restored based on the acquired light intensity information.

Furthermore, it is characterized in that the subject is an object or scene.

Furthermore, it is characterized in that the camera controller controls a first region having a predetermined similarity to the extracted interest region to be formed in the light intensity information acquired by the image sensor, and the extracted interest region to be restored based on the formed first region.

Furthermore, it is characterized in that the depth information and intensity information are comprised of a two-dimensional pixel region for the subject.

Furthermore, it is characterized in that the camera controller controls the interest region to be extracted from the acquired depth information when the corresponding relation between a pixel value corresponding to each coordinate of the depth information and a pixel value corresponding to each coordinate of the light intensity information is not identical.

Furthermore, it is characterized in that each pixel value in a two-dimensional pixel region constituting the depth information is expressed by distance information between the image sensor and the subject.

Furthermore, it is characterized in that each pixel value in a two-dimensional pixel region constituting the light intensity information is expressed by a light intensity value reflected from the subject with respect to the light illuminated from the emitter.

Furthermore, it is characterized in that the first region is comprised of pixels having a coordinate value same as the extracted interest region and coordinate values corresponding to the neighbourhood of the same coordinate value.

Furthermore, it is characterized in that the camera controller controls the first region to be formed to have the a predetermined shape around a pixel corresponding to the coordinate value same as the extracted interest region.

Furthermore, it is characterized in that the predetermined shape is a square or circle.

Furthermore, it is characterized in that the camera controller controls the first region to be formed for each of the extracted interest regions when there exist a plurality of the extracted interest regions.

Furthermore, it is characterized in that the image sensor acquires depth information and light intensity information from the subject using time-of-flight.

Furthermore, according to the present disclosure, there is provided an image display method including capturing a subject to acquire a depth image; restoring an interest region based on depth information and light intensity information when the interest region exists in the acquired depth image; and displaying the restored depth image.

Furthermore, it is characterized in that said restoring the interest region includes acquiring depth information and light intensity information from a subject; determining whether there exists an interest region in the acquired depth information, and extracting the interest region from the acquired depth information when there exists the interest region as a result of the determination; forming a first region having a predetermined similarity to the extracted interest region from the light intensity information, and restoring the extracted interest region based on the formed first region.

According to the present disclosure, a dead pixel is restored in a depth map using an intensity map in a TOF camera, thereby clearly displaying a boundary portion of the captured image, and minimizing the effect due to lighting or a shadow.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 6 is a view illustrating a method of restoring a dead pixel generated from a depth map using the depth map and light intensity map that have been acquired through the image sensor according to an embodiment of the present invention;

DETAILED DESCRIPTION OF THE INVENTION

Hereinafter, the present invention will be described in more detail with reference to the accompanying drawings.

A suffix "module" or "unit" used for constituent elements disclosed in the following description is merely intended for easy description of the specification, and thus the suffix "module" or "unit" may be interchangeably used each other.

On the other hand, an image display apparatus disclosed herein is an intelligent image display apparatus in which a computer-supported function is added to a broadcast receiving function, for example. The Internet function or the like may be added thereto while being faithful to the broadcast receiving function, and thus it may include an easy-to-use interface such as a handwriting type input device, a touch screen, a space remote controller or the like. Furthermore, due to the support of a wired or wireless Internet function, it may be connected to the Internet and a computer, thereby allowing functions, such as e-mail, web browsing, banking, game or the like, to be implemented. A standardized general-purpose OS may be used for such various functions.

Accordingly, for the image display apparatus disclosed herein, for example, various applications can be freely added or removed on a general-purpose OS kernel, thereby allowing various user-friendly functions to be carried out. More specifically, the image display apparatus may be network TV, HBBTV, smart TV and the like, and may be applicable to a smart phone according to circumstances.

Moreover, the embodiments of the present invention will be described in detail with reference to the accompanying drawings and the description disclosed therein, but the present invention will not be limited or restricted by the embodiments.

Further, for the terminology used herein, general terms are selected which are widely used at present while taking the functions in the present invention into consideration, but it may vary according to the intention of those skilled in the art, general practices, or the advent of a new technology. Furthermore, in a specific case, terms arbitrarily selected by the present applicant may be used, and in this case, the meaning of the used terms will be disclosed in the corresponding portion of the detailed description. It should be noted that the terms used in this specification should not be merely construed as the nominal meaning thereof, but construed by the implied meaning thereof and the overall description of the specification.

Figure 1:
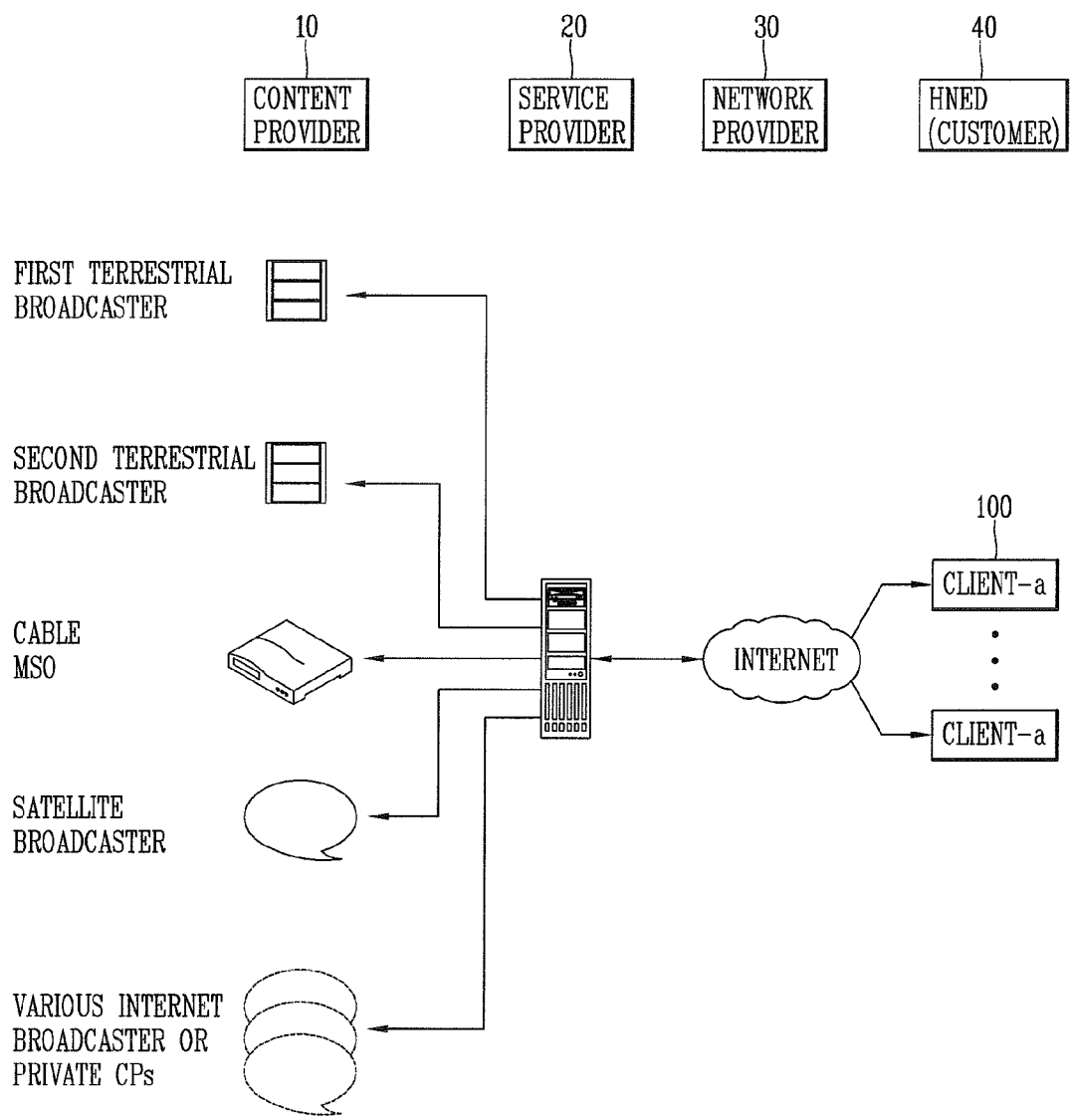
FIG. 1 is a view illustrating an example of a system including an image display apparatus according to an embodiment of the present invention.

FIG. 1 is a view illustrating an example of an overall broadcast system including an image display apparatus according to an embodiment of the present invention.

As illustrated in FIG. 1, an overall broadcast system including an image display apparatus according to an embodiment of the present invention may be divided into a Content Provider (CP) 10, a Service Provider (SP) 20, a Network Provider (NP) 30, and a Home Network End Device (HNED) 40. The HNED corresponds to a client 100, which is an image display apparatus according to an embodiment of the present disclosure, for example. The client 100 falls under an image display apparatus according to an embodiment of the present disclosure, and for example, the image display apparatus may be network TV, smart TV, IPTV, and the like.

The content provider 10 produces and provides various contents. For the content provider 10, for example, there may be a terrestrial broadcaster, a cable system operator (SO) or MSO (Multiple System Operator), a satellite broadcaster, an Internet broadcaster, and the like.

Furthermore, the content provider 10 may provide various applications or the like in addition to broadcast contents. In this regard, it will be described in detail below.

The service provider 20 may provide contents that are provided by the content provider 10 in a service package form. For example, the service provider 20 in FIG. 1 may package first terrestrial broadcast services, second terrestrial broadcast services, cable MSO, satellite broadcast services, various kinds of Internet broadcast services, applications and the like into a package to provide them to the user.

On the other hand, the service provider 20 may provide services to the side of the client 100 using the unicast or multicast method. The unicast method is a process of transmitting data on a one to one basis between one transmitter and one receiver. In case of the unicast method, for example, if the receiver requests data to the server, then the server can transmit data to the receiver according to the request. The multicast method is a process of transmitting data to a plurality of receivers in a specific group. For example, the server can transmit data in a lump to a plurality of previously registered receivers. The Internet Group Management Protocol (IGMP) or the like may be used for the multicast registration.

The network provider 30 may provide a network for providing services to the client 100. The client 100 may establish a Home Network End User (HNED) to receive services.

For a means of protecting content transmitted from the foregoing image display apparatus system, conditional access, content protection or the like may be used. As an example of the conditional access or content protection, a process may be used such as CableCARD, DCAS (Downloadable Conditional Access System) or the like.

On the other hand, the client 100 may also provide content through a network. In this case, contrary to the foregoing case, inversely, the client 100 may be a content provider, and the content provider 10 may receive content from the client 100. In such a design, it may have an advantage capable of performing bi-directional content services or data services.

Figure 2:
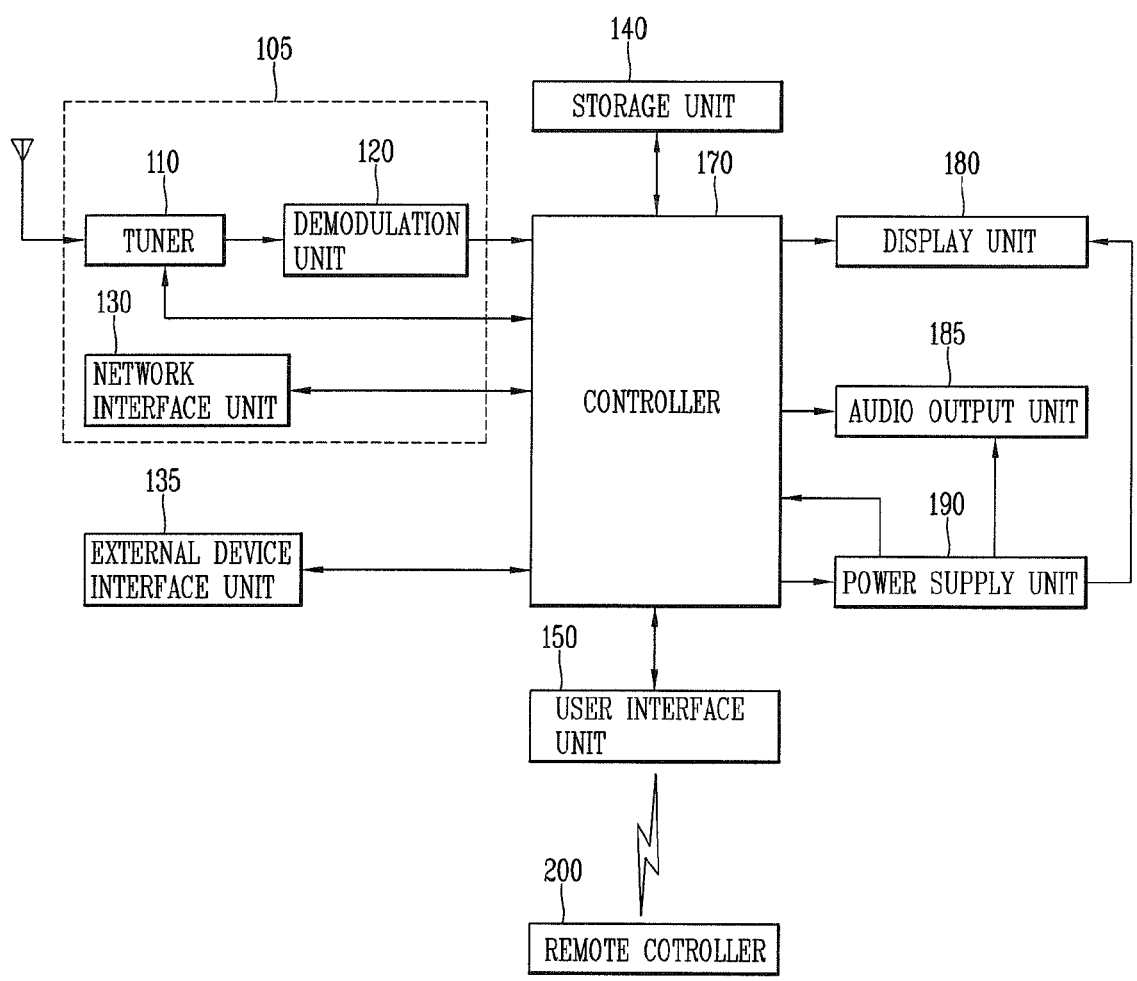
FIG. 2 is a view specifically illustrating an example of an image display apparatus illustrated in FIG. 1.

FIG. 2 is a view more specifically illustrating another example of an image display apparatus illustrated in FIG. 1.

Referring to FIG. 2, the image display apparatus 100 according to an embodiment of the present disclosure may include a broadcast receiver 105, an external device interface unit 135, a storage unit 140, a user input interface unit 150, a controller 170, a display unit 180, an audio output unit 185, a power supply unit 190, and a camera unit (not shown). The content provider 10 may include a tuner 110, a demodulation unit 120, and a network interface unit 130. Of course, according to circumstances, a design can be made to have the tuner 110 and the demodulation unit 120 without including the network interface unit 130, and on the contrary, a design can be made to have the network interface unit 130 without including the tuner 110 and the demodulation unit 120.

The tuner 110 selects a RF broadcast signal corresponding to the channel selected by the user or every prestored channels from the radio frequency (RF) broadcast signals received through an antenna. Furthermore, the tuner 110 transforms the selected RF broadcast signal into an intermediate frequency signal, a baseband image, or an audio signal.

For example, the selected RF broadcast signal may be transformed into a digital IF (DIF) signal if it is a digital broadcast signal, and may be transformed into an analog baseband video or audio signal (CVBS/SIF) if it is an analog broadcast signal. In other words, the tuner 110 can process both digital broadcast signals and analog broadcast signals. The analog baseband video or audio signal (CVBS/SIF) outputted from the tuner 110 may be directly input to the controller 170.

Furthermore, the tuner 110 may receive RF broadcast signals with a single carrier according to the Advanced Television System Committee (ATSC) method or RF broadcast signals having with a plurality of carriers according to the Digital Video Broadcasting (DVB) method.

On the other hand, the tuner 110 may sequentially select RF broadcast signals on all broadcast channels that have been stored through a channel storage function among the RF broadcast signals received through the antenna to transform it to an intermediate frequency signal or baseband video or audio signal.

The demodulation unit 120 receives a digital IF (DIF) signal that has been transformed by the tuner 110 to perform a demodulation operation.

For example, if the digital IF signal outputted from the tuner 110 is the ATSC method, then the demodulation unit 120 may perform 8-vestigal side band (8-VSB) demodulation, for instance. Furthermore, the demodulation unit 120 may perform channel decoding. For this purpose, the demodulation unit 120 may include a Trellis decoder, a de-interleaver, a Reed-Solomon decoder, and the like, to perform Trellis decoding, de-interleaving, and Reed-Solomon decoding.

For example, if the digital IF signal is the DVB method, then the demodulation unit 120 may perform Coded Orthogonal Frequency Division Modulation (COFDMA) demodulation, for instance. Furthermore, the demodulation unit 120 may perform channel decoding. For this purpose, the demodulation unit 120 may include a convolution decoder, a de-interleaver, a Reed-Solomon decoder and the like to perform convolution decoding, de-interleaving, and Reed-Solomon decoding.

The demodulation unit 120 may perform demodulation and channel decoding and then output a stream signal (TS). Here, the stream signal may be a multiplexed signal with video, audio, or data signals. For example, the stream signal may be a multiplexed MPEG-2 Transport Stream (TS) with an MPEG-2 video signal, a Dolby AC-3 audio signal, and the like. More specifically, MPEG-2 TS may include a 4-byte header, and a 184-byte payload.

On the other hand, the foregoing demodulation unit 120 may be provided in a separate manner according to the ATSC method or DVB method. In other words, it can be provided with an ATSC demodulation unit and a DVB demodulation unit.

The stream signal outputted from the demodulation unit 120 may be input to the controller 170. The controller 170 may perform inverse-multiplexing, video/audio signal processing and the like, and then output video to the display unit 180, and output audio to the audio output unit 185.

The external device interface unit 135 may be provided to connect an external device with the image display apparatus 100. For this purpose, the external device interface unit 135 may include an A/V input and output unit (not shown) or wireless communication unit (not shown).

The external device interface unit 135 may be connected to an external device such as a digital versatile disc (DVD), a Blu-ray disc, a gaming device, a camera, a camcorder, a computer (notebook) and the like in a wired/wireless manner. The external device interface unit 135 may transfer video, audio or data signals received from the outside through an external device connected thereto to the controller 170 of the image display apparatus 100. Furthermore, the external device interface unit 135 may output video, audio or data signals processed by the controller 170 to the external device connected thereto. For this purpose, the external device interface unit 135 may include an A/V input and output unit (not shown) or wireless communication unit (not shown).

The A/V input and output unit may include a USB terminal, a Composite Video Banking Sync (CVBS) terminal, a component terminal, a S-video terminal (analog), a Digital Visual Interface (DVI) terminal, a High Definition Multimedia Interface (HDMI) terminal, a RGB terminal, a D-SUB terminal, and the like.

The wireless communication unit may perform short-range wireless communication with other electronic devices. The image display apparatus 100 may be connected to other electronic devices in a network according to a communication standard such as Bluetooth, Radio Frequency Identification (RFID), Infrared Data Association (IrDA), Ultra Wideband (UWB), ZigBee, Digital Living Network Alliance (DLNA), and the like.

Furthermore, the external device interface unit 135 may be connected to at least one of various set-top boxes and the foregoing various terminals to perform an input and output operation with the set-top box.

On the other hand, the external device interface unit 135 may receive an application or application list within the adjoining external device to transfer it to the controller 170 or the storage unit 140.

The network interlace unit 130 provides an interface for connecting the image display apparatus 100 to a wired/wireless network including the Internet network. The network interface unit 130 may include an Ethernet terminal, or the like, for example, for the connection with a wired network, and a communication standard such as Wireless LAN (WLAN, Wi-Fi), Wireless broadband (Wibro), World Interoperability for Microwave Access (Wimax), High Speed Downlink Packet Access (HSDPA), for example, for the connection with a wireless network.

The network interface unit 130 may transmit or receive data to or from another user or another electronic device through a connected network or another network linked with the connected network. In particular, the network interface unit 130 may send part of the content data stored in the image display apparatus 100 to a previously registered user or a selected user or selected electronic device among other electronic devices.

On the other hand, the network interface unit 130 may be connected to a specific web page through a connected network or another network linked the connected network. In other words, the network interface unit 130 may be connected to a specific web page through a network to send or receive data to or from the relevant server. In addition, the network interface unit 130 may receive content or data provided by the content provider or network operator. In other words, the network interface unit 130 may receive content and information related to the content such as a movie, an advertisement, a game, VOD, a broadcast signal and the like, provided from the content provider or network provider through a network. Furthermore, the network interface unit 130 may receive the firmware's update information or update file provided by the network operator. Furthermore, the network interface unit 130 may send data to the Internet, content provider, or network operator.

Furthermore, the network interface unit 130 may receive a desired application among the applications open to the public through a network.

The storage unit 140 may store programs for each signal processing or control within the controller 170 and may store signal-processed video, audio, or data signals.

Furthermore, the storage unit 140 may perform a function for temporarily storing video, audio, or data signals received from the external device interface unit 135 or network interface unit 130. Furthermore, the storage unit 140 may store information for a predetermined broadcast channel through a channel storage function.

Furthermore, the storage unit 140 may store an application or application list received from the external device interface unit 135 or network interface unit 130.

Furthermore, according to an embodiment of the present disclosure, the storage unit 140 may store mapping data for the user's gesture using a predetermined object with the operation of an image display apparatus or the operation on an application.

Furthermore, the storage unit 140 may store feature information for specified objects as a database, and may store a list of applications on which the specified objects are suitably used for an input means as a database.

The storage unit 140 may include at least one type of storage medium including a flash memory type, a hard disk type, a multimedia card micro type, a card-type memory (e.g., SD or XD memory, etc), a Random Access Memory (RAM), a Read-Only Memory (EPROM, etc.), and the like. The image display apparatus 100 may reproduce a content file (a video file, a still image file, a music file, a document file, an application file, etc.) stored in the storage unit 140 to provide to the user.

FIG. 2 illustrates an example in which the storage unit 140 is provided in a separate manner from the controller 170, but the scope of the present invention is not limited to this. The storage unit 140 may be included in the controller 170.

The user input interface unit 150 may transfer the user's input signals to the controller 170 or transfer signals received from the controller 170 to the user.

For example, the user input interface unit 150 may receive and process control signals, such as power on/off, channel selection, screen setting and the like, generated from the remote control device 200 or transmit and process control signals generated from the controller 170 to the remote control device 200 according to various communication methods, such as radio frequency (RF) communication, infrared (IR) communication and the like.

Furthermore, for example, the user input interface unit 150 may transfer control signals received from a local key (not shown), such as a power key, a channel key, a volume key, a setting key and the like, to the controller 170.

Furthermore, for example, the user input interface unit 150 may transfer control signals received from a sensing unit (not shown) for sensing the user's gesture to the controller 170 or transmit signals generated from the controller 170 to the sensing unit (not shown). Here, the sensing unit (not shown) may include a touch sensor, a voice sensor, a location sensor, an operation sensor, and the like.

The controller 170 may inverse-multiplex a stream received from the tuner 110, demodulation unit 120 or external device interface unit 135, and otherwise, process the inverse-multiplexed signals to generate or output signals for video or audio output.

The video signal that has been image-processed in the controller 170 may be inputted to the display unit 180 and displayed as video corresponding to the relevant video signal. Furthermore, the video signal that has been image-processed in the controller 170 may be inputted to an external output device through the external device interface unit 135.

The audio signal processed in the controller 170 may be audio-outputted to the audio output unit 185. Furthermore, the audio signal processed in the controller 170 may be inputted to an external output device through the external device interface unit 135.

Though not shown in FIG. 2, the controller 170 may include an inverse-multiplexing unit, a video processing unit and the like.

In addition, the controller 170 may control an overall operation within the image display apparatus 100. For example, the controller 170 may control the tuner 110 to tune a RF broadcast signal corresponding to the user's tuned channel or prestored channel.

Furthermore, the controller 170 may control the image display apparatus 100 by the user's command received through the user input interface unit 150 or internal program. In particular, a network may be connected thereto, thereby allowing the user's desired application or application list to be downloaded into the image display apparatus 100.

For example, the controller 170 may control the tuner 110 to receive a signal of the tuned channel according to a predetermined channel select command received through the user input interface unit 150. Then, the controller 170 processes video, audio or data signals of the tuned channel. The controller 170 may allow the user's tuned channel information or the like to be outputted through the display unit 180 or the audio output unit 185 together with the processed video or audio signal.

For another example, the controller 170 may allow video or audio signals generated from an external device, for example, a camera or camcorder, received through the external device interface unit 135, to be outputted through the display unit 180 or the audio output unit 185 according to an external device video play command received through the user input interface unit 150.

On the other hand, the controller 170 may control the display unit 180 to display an image. For example, the controller 170 may control a broadcast image received through the tuner 110, an external input image received through the external device interface unit 135, an image received through a network interface unit, or an image stored in the storage unit 140, to be displayed on the display unit 180. Here, the image displayed on the display unit 180 may be a still or moving image, and otherwise, may be a 2D or 3D image.

Furthermore, the controller 170 may control content to be reproduced. The content at this time may be content stored within the image display apparatus 100, received broadcast content, or external input content received from the outside. The content may be at least one of a broadcast image, an external input image, an audio file, a still image, a connected web screen, and a document file.

The display unit 180 may convert video, data and OSD signals that are processed by the controller 170, video and data signals that are received from the external device interface unit 135, or the like, into R, G, and B signals, respectively, to generate a drive signal.

The display unit 180 may be provided with a PDP, an LCD, an OLED, a flexible display, a 3D display, and the like.

On the other hand, the display unit 180 may be configured with a touch screen to be used as an input device in addition to an output device.

The audio output unit 185 may receive a audio-processed signal, for example, a stereo signal, a 3.1-channel signal or a 5.1-channel signal from the controller 170 to output it as audio. The audio output unit 185 may be implemented by various types of speakers.

On the other hand, to detect the user's gesture, the image display apparatus 100 may further include a sensing unit (not shown) having at least one of a touch sensor, a voice sensor, a location sensor and an operation sensor as described above. The signal detected by the sensing unit (not shown) may be transferred to the controller 170 through the user input interface unit 150.

On the other hand, the camera unit (not shown) for capturing a subject (object or scene) may be further provided therein. Image information captured by the camera unit (not shown) may be input to the controller 170.

The camera unit (not shown) will be described in detail below in FIG. 5.

The power supply unit 190 may supply the relevant powers over the entire image display apparatus 100.

In particular, the power supply unit 190 may supply power to the controller 170 that can be implemented in a system-on-chip (SOC) form, a display unit 180 for displaying video, an audio output unit 185 for outputting audio.

For this purpose, the power supply unit 190 may include a converter (not shown) for converting alternating-current power into direct-current power. On the other hand, for example, if the display unit 180 is implemented as a liquid crystal panel having a plurality of backlight lamps, then an inverter (not shown) capable of performing a PWM operation may be further included therein for brightness variation or dimming driving.

The remote control device 200 transmits a user input to the user input interface unit 150. For this purpose, the remote control device 200 may use various communication techniques such as Bluetooth, Radio Frequency (RF) communication, Infrared (IR) communication, Ultra Wideband (UWB), ZigBee, and the like.

In addition, the remote control device 200 may receive video, audio, or data signals outputted from the user input interface unit 150 to display it on the remote control device 200 or output audio or vibration.

The foregoing image display apparatus 100 may be a fixed-type digital broadcast receiver capable of receiving at least one of ATSC (8-VSB) broadcast services, DVB-T (COFDM) broadcast services, and ISDB-T (BST-OFDM) broadcast services.

On the other hand, the block diagram of the image display apparatus 100 illustrated in FIG. 2 is a block diagram for an embodiment of the present invention. Each constituent element in the block diagram may be integrated, added, or deleted according to the specification of an actually implemented image display apparatus 100. In other words, according to circumstances, two or more constituent elements may be integrated into one constituent element, or one constituent element may be divided into two or more constituent elements. Furthermore, the function carried out in each block is provided to describe the embodiment of the present invention, and the detailed operation or device will not limit the rights scope of the present invention.

On the other hand, the image display apparatus 100, contrary to FIG. 2, may not have the tuner 110 and the demodulation unit 120 as illustrated in FIG. 2, but may receive or play video content through the network interface unit 130 or external device interface unit 135.

On the other hand, the image display apparatus 100 is an example of the video signal processing device that performs signal processing for an image stored in the device or inputted to the device. Other examples of the video signal processing device may further include a set-top box excluding the display unit 180 and the audio output unit 185, the foregoing DVD player, a Blue-ray player, a gaming device, a computer, and the like.

Figure 3:
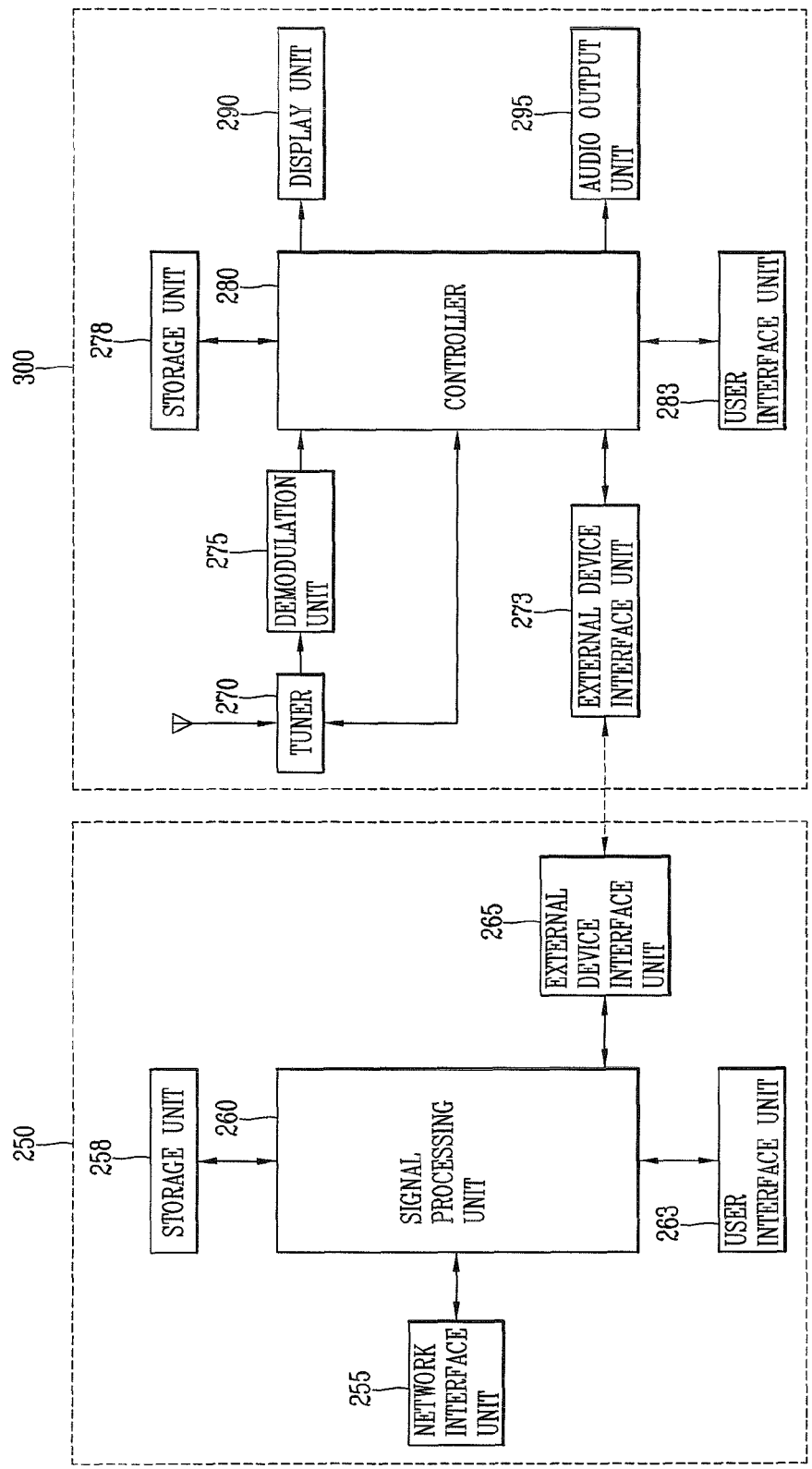
FIGS. 3 and 4 are views illustrating that any one of image display apparatus according to the embodiments of the present invention is distinguished into a set-top box and a display unit.
Figure 4:
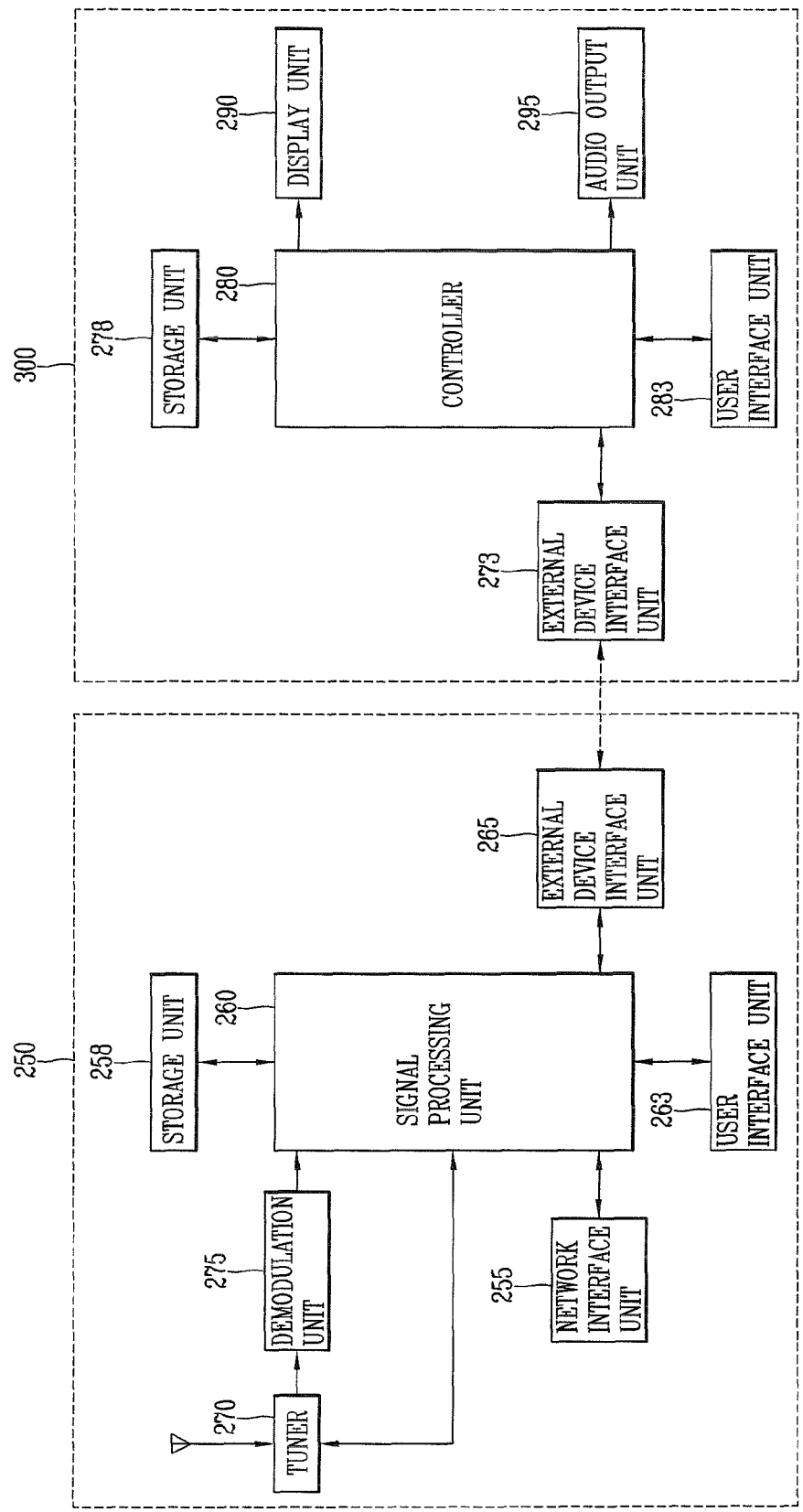

FIGS. 3 and 4 are views illustrating that any one of image display apparatus according to the embodiments of the present invention is distinguished into a set-top box and a display unit.

First, referring to FIG. 3, a set-top box 250 and a display device 300 may transmit or receive data in a wired or wireless manner.

The set-top box 250 may include a network interface unit 255, a storage unit 258, a signal processing unit 260, a user input interface unit 263, and an external device interface unit 265.

The network interface unit 255 provides an interface for connecting to a wired/wireless network including the Internet network. Furthermore, the network interface unit 255 may transmit or receive data to or from another user or another electronic device through a connected network or another network linked with the connected network.

The storage unit 258 may store programs for each signal processing or control within the signal processing unit 260, and perform a function for temporarily storing video, audio, or data signals received from the external device interface unit 265 or network interface unit 255.

The signal processing unit 260 performs signal processing for input signals. For example, the signal processing unit 260 may perform inverse-multiplexing or decoding for input video signals, and perform inverse-multiplexing or decoding for input audio signals. For this purpose, the signal processing unit 260 may further include a video decoder or audio decoder. The signal-processed video or audio signals may be transmitted to the display unit 300 through the external device interface unit 265.

The user input interface unit 263 transfers the user's input signals to the signal processing unit 260, or transfers signals generated from the signal processing unit 260 to the user. For example, the user input interface unit 263 may receive various control signals, such as power on/off, operation input, setting input and the like, received through the local key (not shown) or the remote control device 200, and transfer them to the signal processing unit 260.

The external device interface unit 265 provides an interface for transmitting or receiving data to or from an external device connected in a wired/wireless manner. In particular, the external device interface unit 265 provides an interface for transmitting or receiving data to or from the display device 300. In addition, it may be also possible to provide an interface for transmitting or receiving data to or from an external device, such as a gaming device, a camera, a camcorder, a computer (notebook) and the like.

On the other hand, the set-top box 250 may further include a media input unit (not shown) for reproducing media. The examples of such a media input unit may include a Blu-ray input unit (not shown). In other words, the set-top box 250 may be provided with a Blu-ray player. Input media such as a Blu-ray disc or the like may be signal-processed with inverse-multiplexing or decoding in the signal processing unit 260, and then transmitted to the display device 300 through the external device interface unit 265 for the display.

The display device 300 may include a tuner 270, an external device interface unit 273, a demodulation unit 275, a storage unit 278, a controller 280, an user input interface unit 283, a display unit 290, and an audio output unit 295.

The tuner 270, demodulation unit 275, storage unit 278, controller 280, user input interface unit 283, display unit 290, and audio output unit 295 correspond to the tuner 110, demodulation unit 120, storage unit 140, controller 170, user input interface unit 150, display unit 180, and audio output unit 185 as described above in FIG. 6, and thus the description thereof will be omitted.

On the other hand, the external device interface unit 273 provides an interface for transmitting or receiving data to or from an external device connected in a wired/wireless manner. In particular, the external device interface unit 265 provides an interface for transmitting or receiving data to or from the set-top box 250.

As a result, video or audio signals received through the set-top box 250 will be passed through the controller 170, and then outputted through the display unit 180 or audio output unit 185.

On the other hand, referring to FIG. 4, the set-top box 250 and display device 300 are similar to the set-top box 250 and display device 300 illustrated in FIG. 3, but there exists a difference in that the tuner 270 and demodulation unit 275 are not located within the display device 300 but located within the set-top box 250. Hereinafter, the difference will be primarily described.

The signal processing unit 260 may perform signal processing for broadcast signals received through the tuner 270 and demodulation unit 275. Furthermore, the user input interface unit 263 may receive an input such as channel selection, channel storage and the like.

Figure 5:
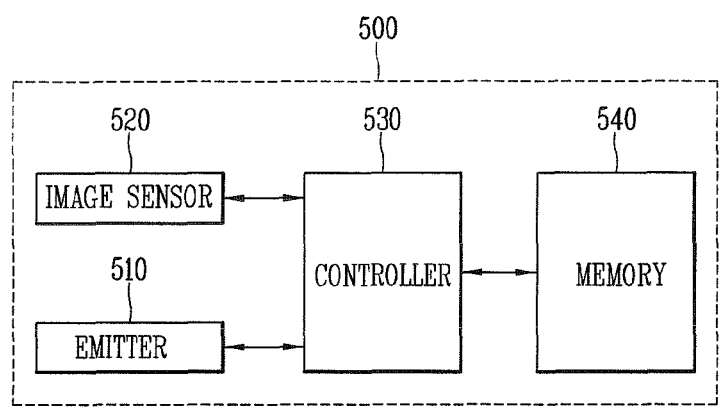
FIG. 5 is a view specifically illustrating a camera unit according to an embodiment of the present invention.

FIG. 5 is a view specifically illustrating a camera unit of the image display apparatus according to an embodiment of the present invention.

The camera unit 500 may be used in combination with other devices as well as the image display apparatus, and otherwise, may be used to capture an image as a single unit without being combined with other devices.

Furthermore, the camera unit may include a plurality of cameras capable of acquiring information different from one another in order to acquire various information through the camera unit. Furthermore, the camera unit may be also referred to as a sensor unit or image capturing unit.

First, the camera unit 500 illustrated in FIG. 5 may include an emitter 510, an image sensor 520, a controller 530, and a memory 540. Here, the controller and memory refer to a module located within the camera. Accordingly, they may be referred to as a camera controller and a camera memory, respectively.

The emitter 510 may be provided to illuminate light onto a subject (object or scene) located at a front portion of the image device, and infrared (IR) light, or LED may be used for the emitter.

The image sensor acquires depth information and light intensity (strength) information from a subject captured by the camera unit. Here, the image sensor may be a depth image CMOS, for example.

The depth information and light intensity (strength) information acquired by the image sensor 520 may be configured with a two-dimensional pixel region for the subject. In other words, the two-dimensional pixel region has a coordinate plane form having X and Y values, and each pixel constituting the two-dimensional pixel region may be expressed with X and Y values to be distinguished from one another.

Here, each pixel value within the two-dimensional pixel region constituting the depth information may be referred to as distance information between the image sensor and the subject. Here, the distance information may refer to a length expressed with millimeter (mm), centimeter (cm), meter (m), kilometer (km), and the like.

Furthermore, each pixel value within the two-dimensional pixel region constituting the light intensity or strength information may be referred to as an intensity value of light reflected by the subject with reference to the emitted (illuminated) light.

Furthermore, the depth information acquired by the image sensor may be obtained by using a time-of-flight (TOF) method.

Here, the time-of-flight (TOF) method refers to a process of acquiring distance information between the subject (object or scene) and the image sensor using a time-of-flight technique.

In other words, it refers to a method of allowing a TOF camera to emit a light source from the emitter and acquiring distance information between the subject and the image sensor from a phase difference between the emitted light source and the reflected light returned from the subject.

The controller 530 controls the operation of each module constituting the camera unit. In other words, upon receiving a capture-start signal using the camera unit, the controller acquires depth information and light intensity (strength) information for the subject or scene (image, subject) through the image sensor and controls the image sensor to generate a depth image. As described above, the depth information and intensity information may be expressed with a map form having one or more pixel values.

Furthermore, the controller 530 controls an interest region to be extracted from the depth information that has been acquired through the image sensor, and the extracted interest region to be restored based on the light intensity information acquired by the image sensor.

Here, the interest region refers to a pixel region or pixel value corresponding to part of the depth information, particularly, to a dead pixel.

In other words, the controller 530 determines whether there exists a dead pixel in the acquired depth map, and extracts the dead pixel from the depth map when there exists the dead pixel as a result of the determination.

Furthermore, the controller 530 controls a first region having a predetermined similarity to the extracted interest region to be formed in the light intensity information acquired by the image sensor, and then the interest region to be compensated or restored based on pixel values within the formed first region.

Here, the first region is comprised of pixels having a coordinate value same as the extracted interest region and coordinate values corresponding to the neighbourhood of the same coordinate value among the light intensity information acquired by the image sensor.

Here, the controller 530 controls the first region to be formed to have a predetermined shape around a pixel having the coordinate value same as the interest region.

The predetermined shape may be a square or circle, but may be not limited to this, and may correspond to various kinds of shapes.

Furthermore, the controller 530 controls the first region to be formed for each of the interest regions when there exist a plurality of the extracted interest regions.

Furthermore, if the depth information and light intensity information acquired by the image sensor are the same as or similar to one another during a predetermined number of frames, the controller 530 may compensate or restore the interest region based on the depth information in the previous frame when there exists a dead pixel in the depth information.

In other words, the controller 530 may control a dead pixel to be extracted from the current frame and then compared with a portion corresponding to the dead pixel in the previous frame, thereby compensating or restoring the dead pixel.

The memory 540 stores depth information and light intensity (strength) information acquired through the image sensor. Accordingly, if a dead pixel is generated among the depth information acquired by the image sensor, then the camera unit compensate or restore the dead pixel by loading the information stored in the memory, particularly, the intensity information.

In addition, the camera unit 500 may further include an audio receiver. Furthermore, the audio receiver may be configured with a microphone and a sound source recognition unit.

The microphone receives sound waves or ultrasonic waves existing in the neighbourhood of the camera unit and transmits an electrical signal based on the vibration to the camera controller. In other words, the user may control the user's voice to be input to the image display apparatus through the microphone and stored together with an image inputted through the camera unit, and a predetermined operation to be carried out in the image display apparatus through the input audio.

If a predetermined content or service is being used in the image display apparatus, then the sound source recognition unit receives an audio signal of the content or service being used and transmits an electrical signal based on the vibration to the camera controller. In other words, contrary to the microphone, the sound source recognition unit extracts and recognizes an audio signal from broadcast signals received by the image display apparatus.

Furthermore, the image display apparatus according to an embodiment of the present disclosure may grasp the location information of a subject through the camera unit. In particular, if the subject is a person, then the image display apparatus may acquire the location coordinate of each portion of the body to search for the movement of each portion of the body, thereby acquiring information for the detailed operation of the body.

FIG. 6 is a view illustrating a method of restoring a dead pixel generated from a depth map using the depth map and light intensity (strength) map that have been acquired through an image sensor according to an embodiment of the present invention.

First, when a capture signal is input to the camera unit, the image sensor acquires depth information and light intensity information for a subject (object or scene).

Here, the depth information for the subject may be expressed with a two-dimensional map form having X and Y values as illustrated in FIG. 6A. Each pixel value constituting the depth map is a value indicating a distance between the subject and the image sensor.

Next, the controller determines whether there exists a dead pixel among the depth information acquired from the image sensor. As a result of the determination, if there exists the dead pixel, then the controller extracts the dead pixel. Here, the dead pixel refers to an error pixel generated a shadow, an edge or the like when capturing the subject.

The depth map illustrated in FIG. 6A may be classified into a group having pixel values corresponding to 540-550 and a group having pixel values corresponding to 1000-1020. Here, the dead pixel 610 becomes a pixel value having "0" and "4000" that does not correspond to the group.

Next, the controller extracts a dead pixel from the depth map, and then forms a first region having a predetermined similarity to the extracted dead pixel from the light intensity information acquired by the image sensor, namely, an intensity map. Here, the first region refers to an area comprised of pixels having a coordinate value same as the extracted dead pixel or having the neighboring coordinate values of the same coordinate value.

Referring to FIG. 6B, it is seen that the first regions including the extracted dead pixel are formed in the intensity map.

As illustrated in FIG. 6B, since two dead pixels exist in the depth map of FIG. 6A, it is seen that there exist two first regions 620, 630.

Next, the controller compensates or restores a dead pixel based on the formed first region. In other words, the controller may restore the dead pixel to an average pixel value, a minimum pixel value, a maximum pixel value, and the like.

As illustrated in FIG. 6C, it is seen a depth map in which the dead pixels are compensated or restored. In other words, it is seen that the dead pixels "0" and "4000" illustrated in FIG. 6A are restored to "544" and "543" 640, respectively.

Furthermore, the controller may compensate or restore a dead pixel generated in the depth map using a depth map in the previous frame stored in the memory. In other words, the controller compensates or restores the dead pixel by comparing it with a pixel having the coordinate value same as the dead pixel in the previous frame prior to the current frame.

The foregoing situation may be used when the depth maps acquired by the image sensor are the same as or similar to one another during a predetermined number of frames.

Figure 7:
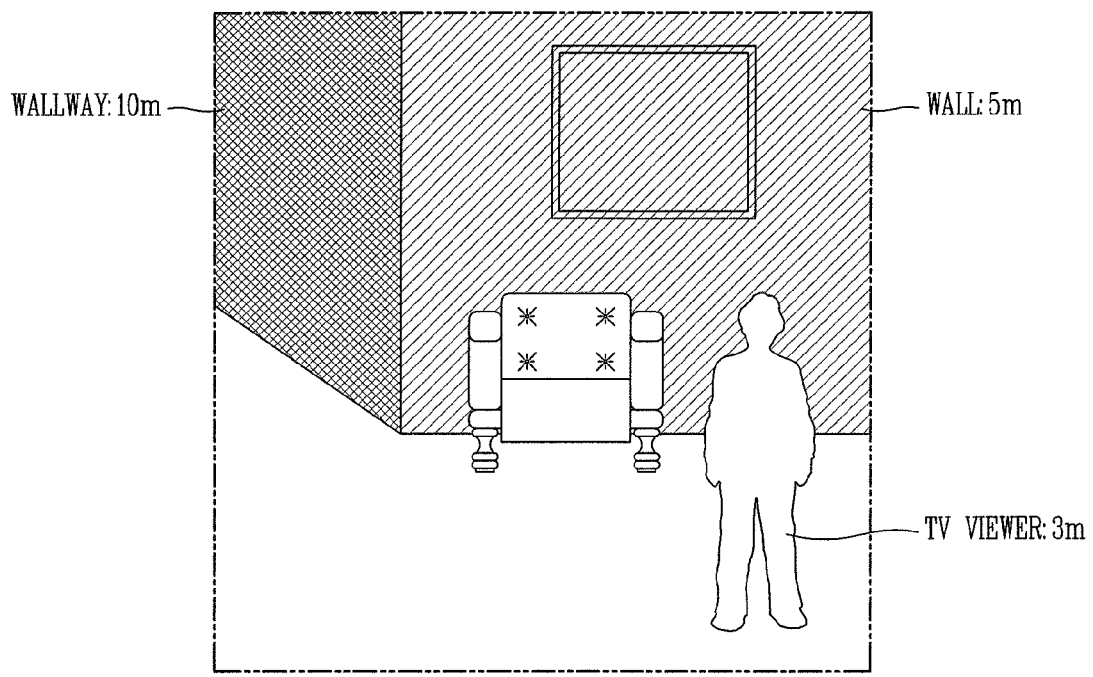
FIG. 7 is a view illustrating a depth image formed by the camera unit according to an embodiment of the present invention.

FIG. 7 is a view illustrating a depth image formed by the camera unit according to an embodiment of the present invention.

As illustrated in FIG. 7, color information such as RGB and the like is not splendidly expressed in an image captured by the image sensor. However, the brightness is expressed by gradation according to a distance, thereby having an advantage of quickly finding out an approximate location of the individual object.

Furthermore, a closely located object is displayed in a bright level and a remotely located object is displayed in a dark level to show a three-dimensional effect.

Referring to FIG. 7, it is seen that a depth image is clearly generated without distorting a boundary portion of the subject or the subject itself by light, shadow or the like in the depth information captured by the image sensor.

Referring to FIG. 7, a hall way located at the farthest distance is displayed in a darkest brightness level, and it is confirmed to be located a distance of about 10 m away from the image sensor. Moreover, a wall located at a halfway distance is displayed in a half-tone, and it is confirmed to be located a distance of about 5 m away from the image sensor. In addition, a person (TV viewer) located at a relatively near distance is displayed in a lightest brightness level, and it is confirmed to be located a distance of about 3 m away from the image sensor.

Furthermore, it is seen that a boundary portion between the hall way and wall is restored by the intensity map that has been acquired by the image sensor, and thus it is clearly displayed.

FIG. 8 is a view illustrating a depth image formed by the camera unit according to another embodiment of the present invention.

Figure 8A:
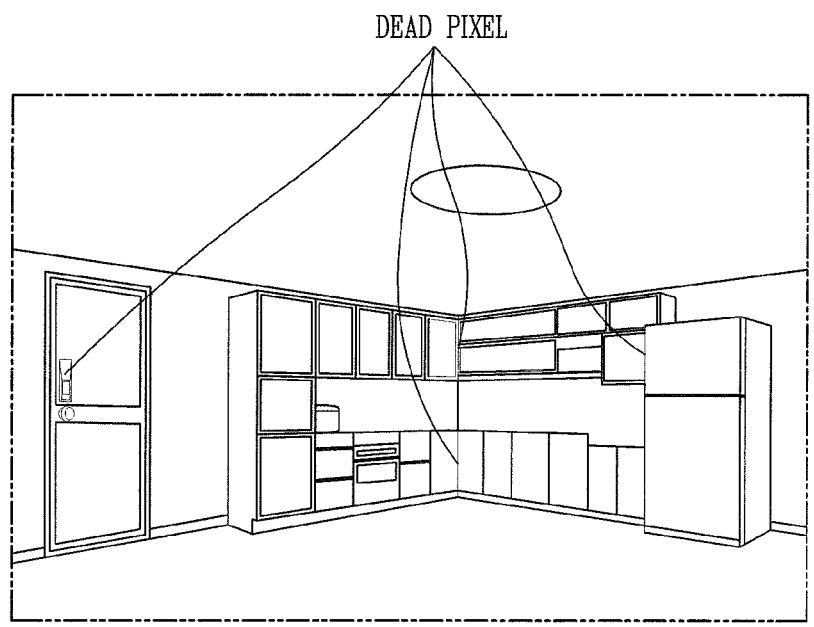
FIG. 8 is a view illustrating a depth image formed by the camera unit according to another embodiment of the present invention.
Figure 8B:
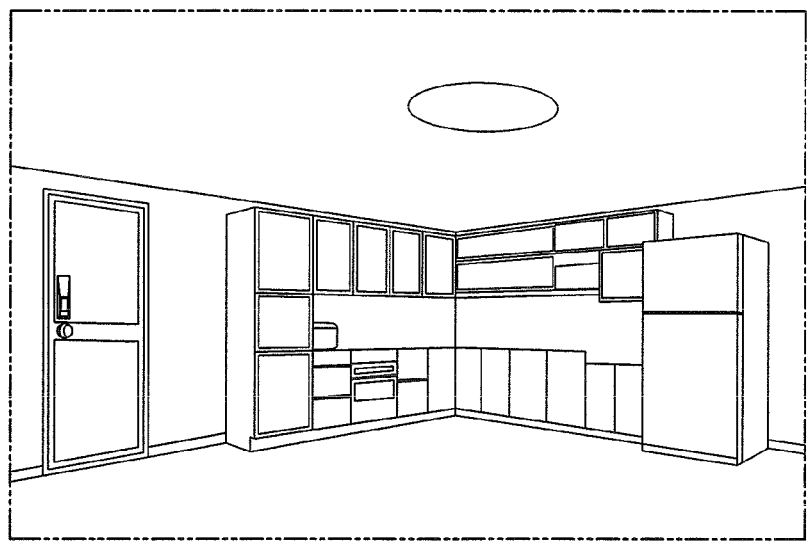

FIG. 8A is a view illustrating a depth image using only a depth map acquired by the image sensor, and FIG. 8B is a view illustrating a depth image using a depth map and an intensity map acquired by the image sensor.

As illustrated in FIG. 8A, when a depth image is generated by only using the depth map information acquired from the subject through the image sensor, it is seen that the depth image for a boundary portion of the subject is not clearly displayed, and furthermore, the depth image generated through the image sensor is unclear due to external lighting or a shadow.

However, referring to FIG. 8B, when a dead pixel of the depth map acquired through the image sensor is restored by using an intensity map acquired by the image sensor, it is seen that an unclear portion (a boundary portion or blurred portion due to a shadow, lighting or the like) in the depth image illustrated in FIG. 8A is clearly displayed.

Figure 9A:
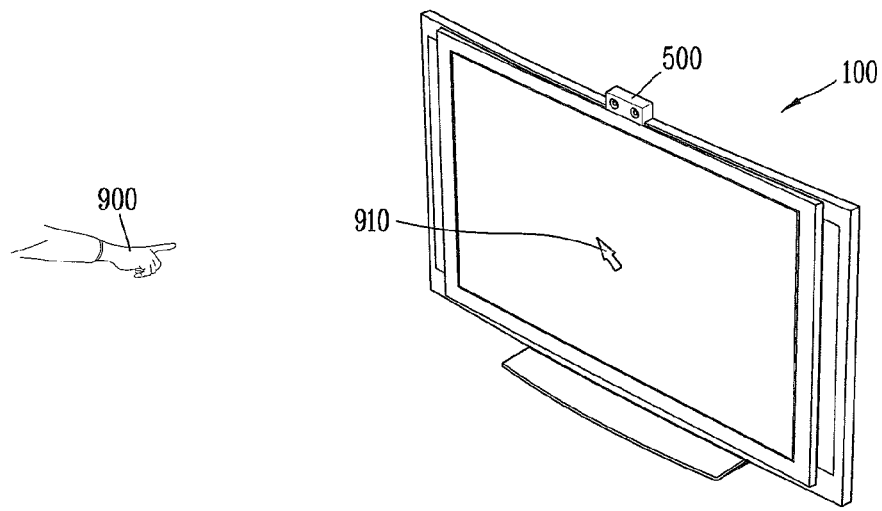
FIG. 9A is a view illustrating that an indicator is displayed when a depth map according to an embodiment of the present disclosure has been restored.
Figure 9B:
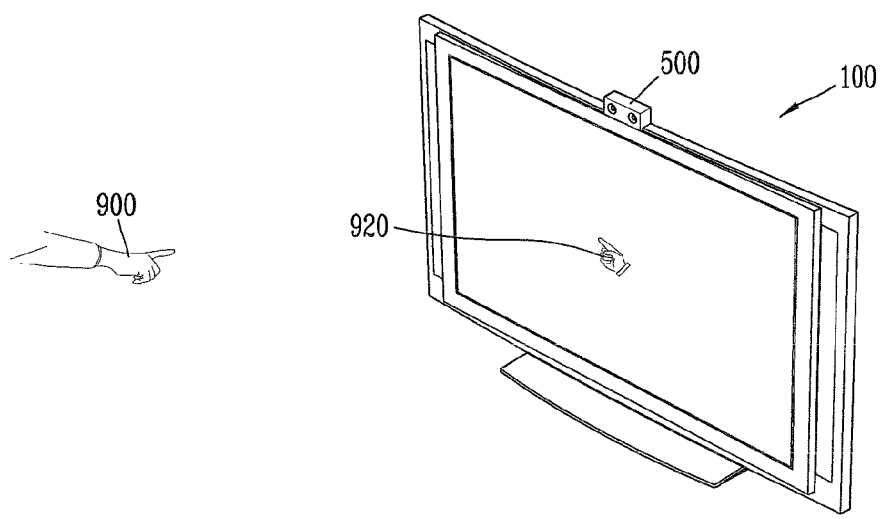
FIGS. 9B and 9C are views illustrating that an indicator corresponding to a shape of the restored depth map according to an embodiment of the present disclosure is displayed.
Figure 9C:
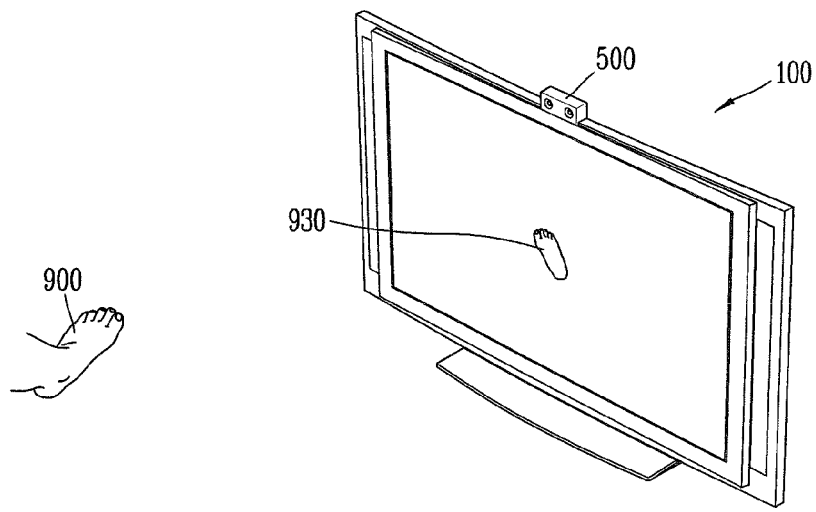
Figure 9D:
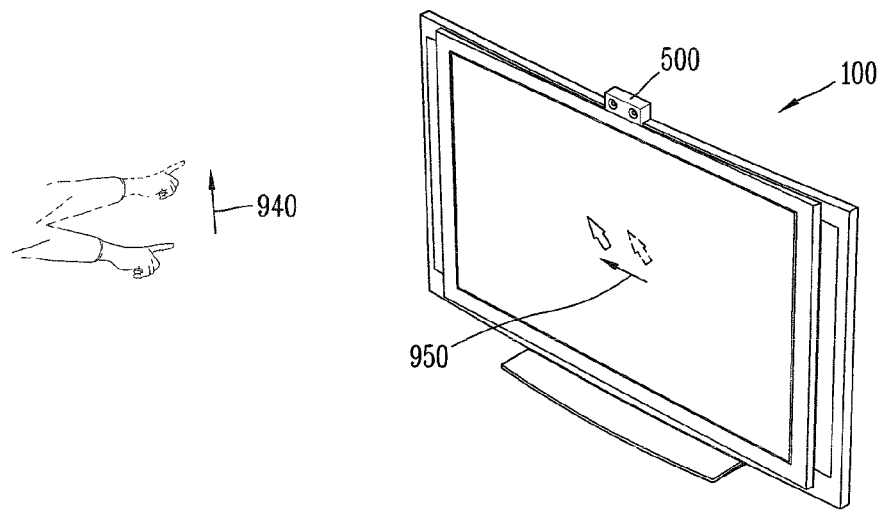
FIG. 9D is a view illustrating that an indicator is moved according to a movement of the subject according to an embodiment of the present disclosure.

FIG. 9A is a view illustrating that an indicator is displayed when a depth map according to an embodiment of the present disclosure has been restored, and FIGS. 9B and 9C are views illustrating that an indicator corresponding to a shape of the restored depth map is displayed, and FIG. 9D is a view illustrating that an indicator is moved according to a movement of the subject.

The camera unit 500 acquires a depth image from the subject. If there exists an interest region (i.e., dead pixel) in the acquired depth image, then the camera unit restores the interest region of the acquired depth image using the depth map and intensity map of the subject 900.

When the interest region is restored, the controller controls an indicator 910, 920, 930 to be displayed on the display unit.

The indicator may correspond to a shape of the restored depth image as illustrated in FIGS. 9B and 9C (920, 930).

For example, as illustrated in FIG. 9B, if the restored depth image, namely, the shape of the subject, is a hand 900, then the shape of the indicator displayed on the display unit may be a hand 920. Furthermore, as illustrated in FIG. 9C, if the restored depth image, namely, the shape of the subject, is a foot 900, then the shape of the indicator displayed on the display unit may be a foot 930.

Furthermore, if it is determined that the shape of the restored depth image corresponds to any one of the human body (particularly, a hand or foot), then the controller controls an application having a remoter controller or a space remote controller to be displayed on the display unit.

FIG. 9D illustrates a shape in which an indicator is moved according to a movement of the subject 940 when the indicator is displayed on the display unit (950).

In other words, if the subject is moved in any one direction of left, right, top or down, then the indicator displayed on the display unit may be also moved together in any one direction of left, right, top or down according to the movement of the subject.

As illustrated in FIG. 9D, if the subject, namely, a hand, is moved in an arrow direction (940), then the displayed indicator is also moved along the direction of the movement of the hand (950).

Figure 10:
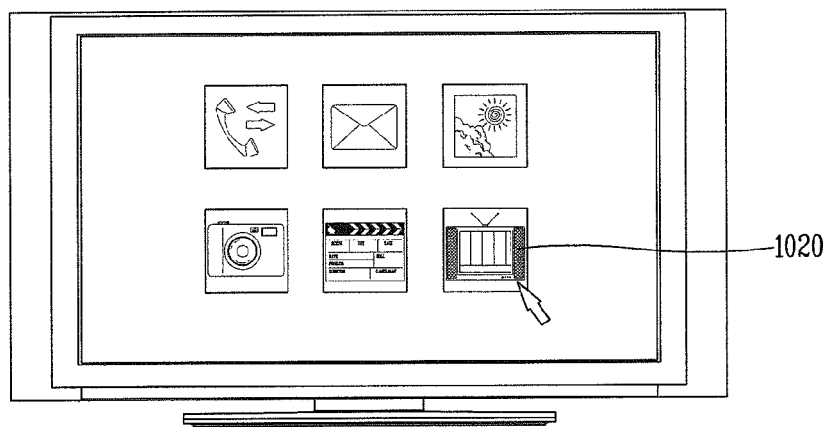
FIG. 10 is a view illustrating that an application is implemented according to a gesture (movement) of the subject according to an embodiment of the present disclosure.
Figure 10:
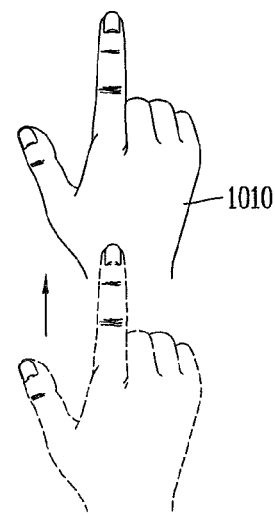

FIG. 10 is a view illustrating that an application is implemented according to a gesture (movement) of the subject according to an embodiment of the present disclosure.

As illustrated in FIG. 9, if the depth image of the subject acquired by the camera unit is restored, then the controller controls an indicator to be displayed on the display unit.

Referring to FIG. 10, when it is detected that subject is drawn near the image display apparatus 1010, then the controller controls an application corresponding to a position located with the indicator or adjacent to the position located with the indicator to be activated (i.e., implemented) 1020.

As illustrated in FIG. 10, if the subject (hand) is drawn near the image display apparatus, then an application at the position located with the displayed indicator is carried out (1020).

Here, if there exist a plurality of applications at a place adjacent to the position located with the indicator, then the controller may control an application list according to the distance of the indicator to be displayed for each distance.

Furthermore, if there exists no application at a place adjacent to the position located with the indicator, then the controller may control notification information for guiding a movement of the subject to be displayed visually and auditorily.

As illustrated in FIG. 10, if the controller detects that the indicator is located at an application corresponding to real-time TV broadcasting and the movement of the subject is drawn near the image display apparatus, then the controller may control the application corresponding to real-time TV broadcasting to be carried out.

Figure 11A:
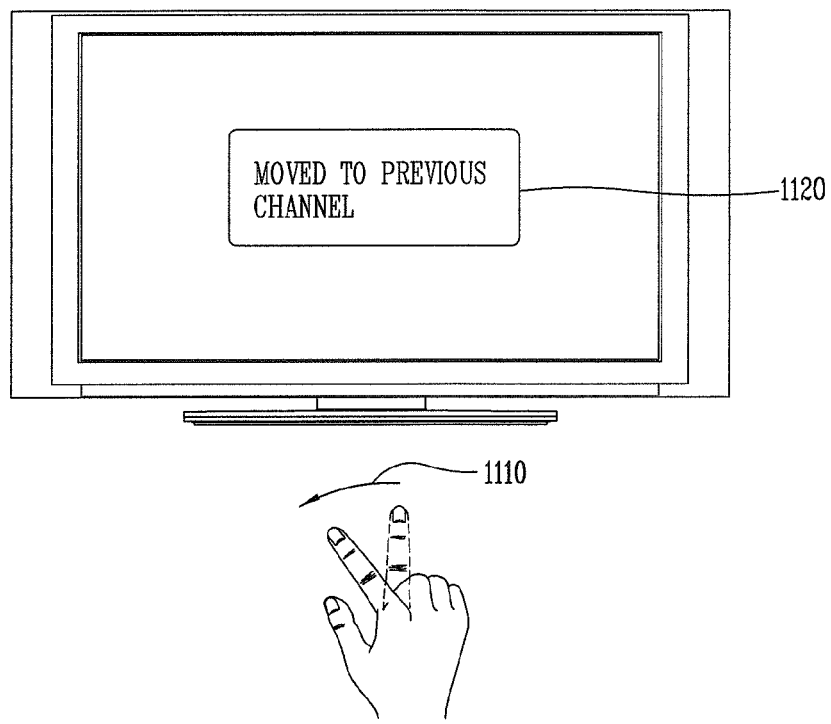
FIGS. 11A and 11B are views illustrating that a specific function is implemented according to a gesture (movement) of the subject according to another embodiment of the present disclosure.
Figure 11B:
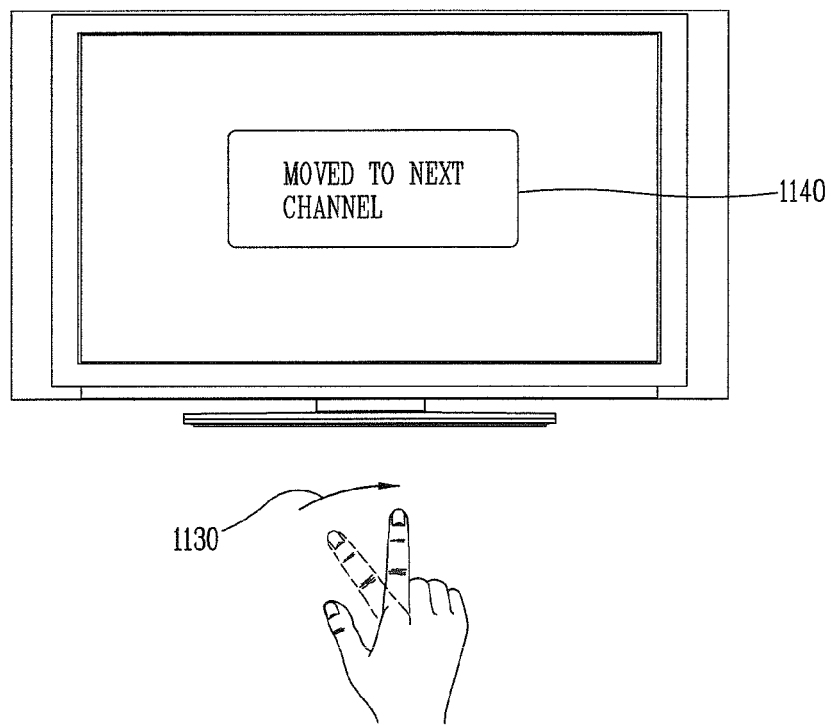

FIGS. 11A and 11B are views illustrating that a specific function is implemented according to a gesture (movement) of the subject according to another embodiment of the present disclosure.

It is assumed that a specific application (for example, real-time TV broadcasting) is implemented by the operation of FIG. 10.

If a movement of the subject in a first direction is detected while real-time TV broadcasting is implemented (1110), then the controller may control the display to unit to output a channel prior to the currently implemented channel or a previously implemented application (1120). Here, the first direction may be a counter-clockwise direction or a movement direction from right to left.

Furthermore, if a movement of the subject in a second direction is detected (1130), then the controller may control the display unit to output a channel subsequent to the currently outputted channel or a screen for selecting another application (1140).

Here, the second direction may be a clockwise direction or a movement direction from left to right.

Here, the first and the second direction may be substituted for each other, and various directions may be applicable without being limited to the disclosed directions.

Figure 12A:
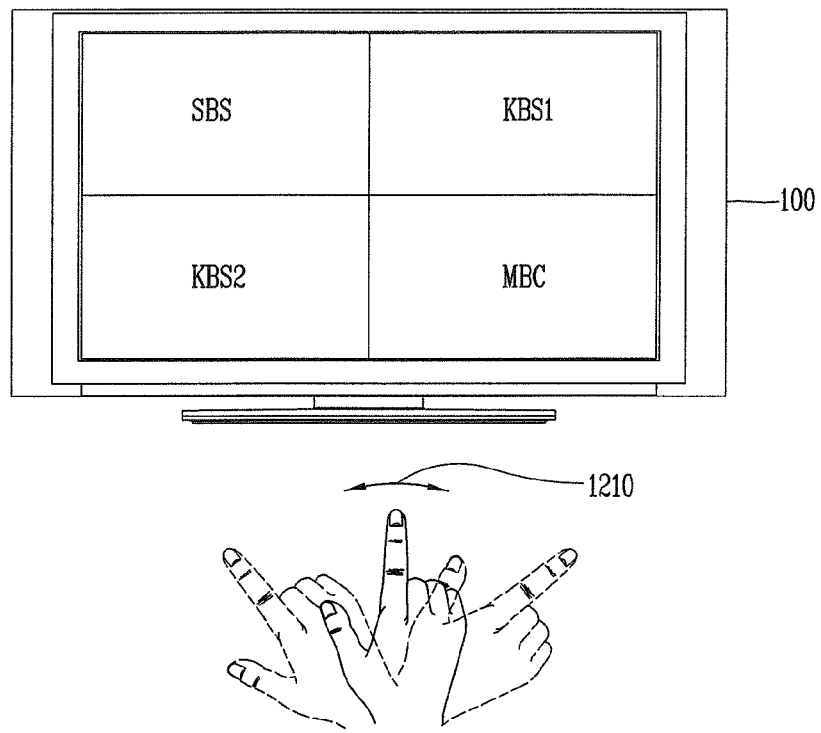
FIGS. 12A and 12B are views illustrating that a specific function is implemented according to a gesture (movement) of the subject according to still another embodiment of the present disclosure.
Figure 12B:
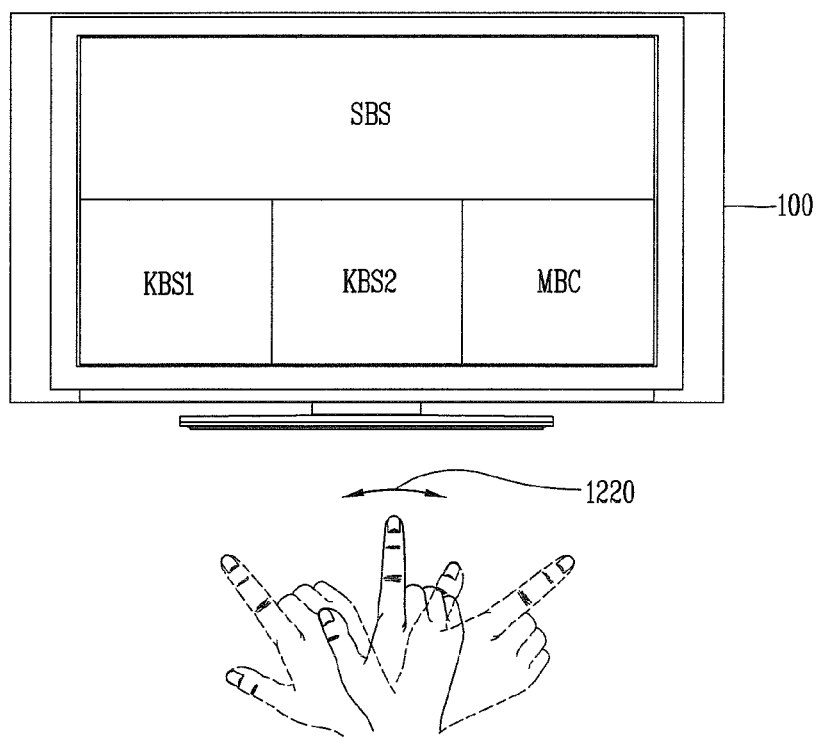

FIGS. 12A and 12B are views illustrating that a specific function is implemented according to a gesture (movement) of the subject according to still another embodiment of the present disclosure.

It is assumed that a specific application (for example, real-time TV broadcasting) is implemented by the operation of FIG. 10.

Referring to FIG. 12, if continuous movements between left and right are detected (1210, 1220), then the controller may control other channels to be additionally displayed together with the currently outputted channel.

In other words, if continuous movements of the subject between left and right are detected, then the controller may control one or more channels to be displayed together.

Furthermore, the controller may control the number of channels outputted to the display unit to be regulated and outputted according to the number of continuous movements between left and right.

For example, the controller may control two channels to be displayed on the display unit if the subject moves twice continuously from left to right, and the controller may control four channels to be displayed on the display unit if the subject moves four times continuously from left to right.

Furthermore, if more than a predetermined number of continuous movements of the subject between left and right are detected, then the controller may control all channels capable of being outputted to be displayed on the display unit.

As illustrated in FIGS. 12A and 12B, when the subject is moved continuously from left to right, it is seen that four channels are displayed on the display unit.

Furthermore, if a plurality of screens or channels are controlled to be displayed on the display unit, then the controller may control the display unit to display the currently implemented channel and the other channels in a distinguished manner.

For example, it may be possible to display the currently implemented channel on the main screen in a large size, and display the other channels on the sub-screens in a size smaller than that of the currently implemented channel. Here, the main screen may be located at the upper center of the display unit.

As illustrated in FIG. 12A, it is seen that the currently implemented channel (SBS) and the other channels (KBS 1, KBS 2, MBC) are displayed in the same size by continuous movements of the subject between left and right (1210). Here, the number of continuous movements of the subject may be four times or more than a predetermined number of times. The number of continuous movements of the subject may be variably changed by the user setting.

As illustrated in FIG. 12B, it is seen that the currently implemented channel (SBS) is displayed in the largest size and the other channels (KBS 1, KBS 2, MBC) are displayed at the bottom end thereof, by continuous movements of the subject (1220). Similarly to FIG. 12A, the number of continuous movements of the subject may be four times, and otherwise, may be more than a predetermined number of times.

What is claimed is:

1. An image display apparatus, comprising:
   a display unit;
   a camera unit configured to capture a subject, and to acquire a depth image from the captured subject; and
   a controller operatively connected to the display unit and the camera unit, the controller configured to extract a dead pixel from depth information of the depth image, to form a first region having a predetermined similarity to the extracted the dead pixel based on light intensity information of the depth image, and to restore pixel value of the dead pixel based on pixel values within the formed first region,
   wherein when the dead pixel is restored, the display unit displays an indicator corresponding to a shape of the restored depth image,
   wherein the controller controls the displayed indicator to be moved or controls a predetermined function to be carried out according to the movement of the subject, and
   wherein when detecting continuous movements of the subject between left and right, the controller is configured to control the number of channels outputted to the display unit to be regulated and outputted according to the number of continuous movements between left and right, and to display a plurality of screen channels corresponding to the number of channels together with currently outputted channel.

2. The image display apparatus of claim 1, wherein the movement of the subject is any one direction of left, right, top or down, or a gesture.

3. The image display apparatus of claim 1, wherein the controller is configured to control an application at a position located with the indicator or adjacent to the position to be activated when detecting a movement of distance between the subject and the image display apparatus drawing closer,
   wherein if there exists a plurality of applications at a place adjacent to the position located with the indicator, the controller controls an application list according to the distance of the indicator to be displayed for each distance, and
   if there exists no application at a place adjacent to the position located with the indicator, the controller controls notification information for guiding a movement of the subject to be displayed visually and auditory.

4. The image display apparatus of claim 1, wherein the predetermined function is a function for displaying the previous or next screen, and the controller is configured to control the predetermined function to be carried out when detecting a rotational movement in a clockwise or counter clockwise direction of the subject.

5. The image display apparatus of claim 1, wherein the camera unit comprises:
   a memory;
   an emitter for illuminating a light source;
   an image sensor configured to acquire depth information and light intensity information from a subject;
   the display unit; and a camera controller is operatively to connected the memory, the emitter, the image sensor, and the display unit, the camera controller configured to extract a dead pixel from depth information of the depth image, to form a first region having a predetermined similarity to the extracted the dead pixel based on light intensity information of the depth image, and to restore pixel value of the dead pixel based on pixel values within the formed first region, wherein when the dead pixel is restored, the display unit displays an indicator corresponding to a shape of the restored depth image, wherein the camera controller controls the displayed indicator to be moved or controls a predetermined function to be carried out according to the movement of the subject, and wherein when detecting continuous movements of the subject between left and right, the camera controller is configured to control the number of channels outputted to the display unit to be regulated and outputted according to the number of continuous movements between left and right and to display a plurality of screen channels corresponding to the number of channels together with currently outputted channel.

6. The image display apparatus of claim 5, wherein the subject is an object or scene.

7. The image display apparatus of claim 5, wherein the camera controller is configured to control a first region having a predetermined similarity to the extracted interest region to be formed in the light intensity information acquired by the image sensor, and the extracted interest region to be restored based on the formed first region.

8. The image display apparatus of claim 5, wherein the depth information and intensity information are comprised of a two-dimensional pixel region for the subject.

9. The image display apparatus of claim 8, wherein the camera controller is configured to control the interest region to be extracted from the acquired depth information when the corresponding relation between a pixel value corresponding to each coordinate of the depth information and a pixel value corresponding to each coordinate of the light intensity information is not identical.

10. The image display apparatus of claim 8, wherein each pixel value in a two-dimensional pixel region constituting the depth information is expressed by distance information between the image sensor and the subject.

11. The image display apparatus of claim 8, wherein each pixel value in a two-dimensional pixel region constituting the light intensity information is expressed by a light intensity value reflected from the subject with respect to the light illuminated from the emitter.

12. The image display apparatus of claim 7, wherein the first region is comprised of pixels having a coordinate value same as the extracted interest region and coordinate values corresponding to the neighborhood of the same coordinate value.

13. The image display apparatus of claim 12, wherein the camera controller is configured to control the first region to be formed to have a predetermined shape around a pixel corresponding to the coordinate value same as the extracted interest region.

14. The image display apparatus of claim 13, wherein the predetermined shape is a square or circle.

15. The image display apparatus of claim 5, wherein the camera controller is configured to control the first region to be formed for each of the extracted interest regions when there exist a plurality of the extracted interest regions.

16. The image display apparatus of claim 5, wherein the image sensor acquires depth information and light intensity information from the subject using time-of-flight.

17. An image display method, the method comprising:
capturing a subject to acquire a depth image;
extracting a dead pixel from depth information of the depth image;
forming a first region having a predetermined similarity to the extracted the dead pixel based on light intensity information of the depth image;
restoring pixel value of the dead pixel based on pixel values within the formed first region;
displaying an indicator corresponding to a shape of the restored depth image on a display unit, when the dead pixel is restored;
controlling the displayed indicator to be moved or controlling a predetermined function to be carried out according to the movement of the subject;
when detecting continuous movements of the subject between left and right, controlling the number of channels outputted to the display unit to be regulated and outputted according to the number of continuous movements between left and right; and
displaying a plurality of screen channels corresponding to the number of channels together with currently outputted channel.

18. The method of claim 17, wherein the depth information and intensity information are comprised of a two-dimensional pixel region for the subject.

19. The method of claim 17, wherein the first region is comprised of pixels having a coordinate value same as the extracted interest region and coordinate values corresponding to the neighbourhood of the same coordinate value.

* * * * *